March 11, 1958     H. J. KLEINVOGEL     2,826,732
ELECTRIC CONTACT CONVERTERS WITH MOTOR DRIVEN CONTACTS
Filed July 22, 1952
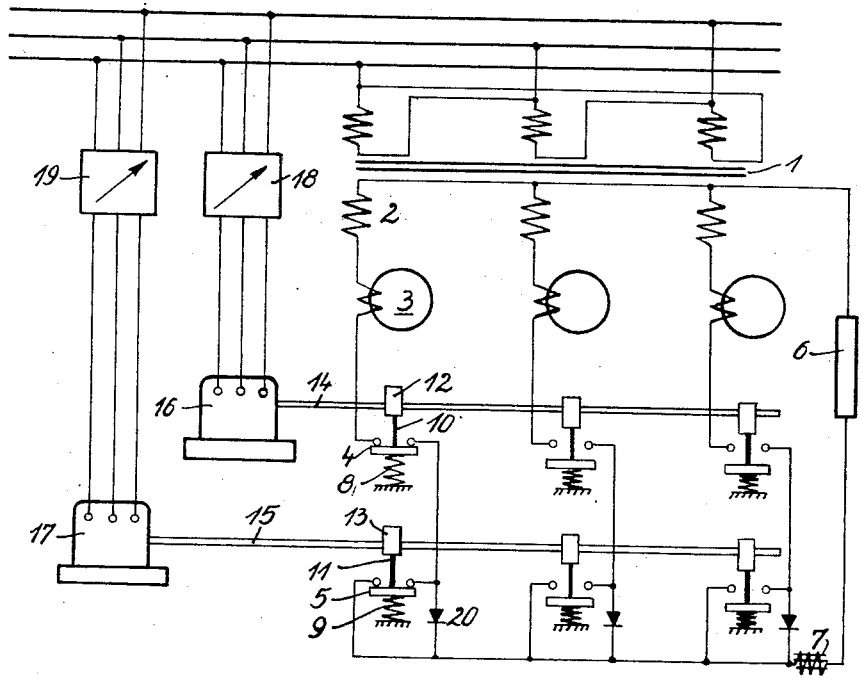
Inventor:
Hans Joachim Kleinvogel
By
C. W. Fry
Attorney

United States Patent Office 2,826,732
Patented Mar. 11, 1958

2,826,732

ELECTRIC CONTACT CONVERTERS WITH MOTOR DRIVEN CONTACTS

Hans Joachim Kleinvogel, Berlin-Siemensstadt, Germany, assignor to Siemens-Schuckertwerke Aktiengesellschaft, Berlin-Siemensstadt, Germany, a corporation of Germany Application July 22, 1952, Serial No. 300,313

Claims priority, application Germany August 9, 1951

2 Claims. (Cl. 321—48)

My invention relates to electric contact converters in which two motor-driven contact devices of mutually overlapping closing periods are series or parallel connected in each phase circuit so that one device closes and the other opens the same phase circuit. Such converters are described in the copending application, Serial No. 267,596, filed January 22, 1952, of Kleinvogel et al., assigned to the assignee of the present invention, now Patent No. 2,738,456. Converters of this type permit adjusting or automatically regulating the length of the resultant total closing periods, or of the interphase commutation intervals, by phase-displacing the closing and opening moments of the circuit-opening contact device (break contact) relative to the corresponding moments of the circuit-closing device (make contact).

To provide for such a phase displacement, the converters according to the above-mentioned copending application have separate cam shafts for driving the make contact and the break contact respectively in each phase circuit, and each cam shaft has a separate synchronous motor energized from the current supply of the converter to operate the contacts in synchronism with the voltage cycle. For adjusting the overlapping interval of the make and break contacts, the cam shaft for the break contact is angularly adjustable relative to the cam shaft of the make contact. To this end, as previously proposed, the stator of the motor driving the cam shaft of the break contact is rotatably mounted on the supporting structure of the converter. For controlling or regulating the converter output voltage on the delayed-commutation principle the prior proposal offers two possibilities. Either the phase position of the cam shaft for the make contact is adjusted relative to the voltage cycle of the multiphase current supply by having also the stator of the motor for the make contact rotatably mounted; or a phase shift transformer is used for the motor of the make contact or for both motors to permit adjusting the phase position of the cam shaft or shafts relative to the cycle of the current supply. With such an adjustment of the phase position of both cam shafts relative to the voltage cycle, the adjustment of the overlapping interval requires a smaller rotational stator-displacement of the break-contact motor than is needed if the output voltage is regulated only by varying the phase position of the motor for the make contact.

It is an object of the present invention to improve converters of the above-mentioned type toward a simpler mechanical design of the converter structure and a purely electrical operation of the pertaining overlap adjusting or regulating devices.

Another object of my invention is to improve in converters of the above-mentioned type the magnetic control of the pertaining saturable commutating reactors during those intervals of time, near the circuit opening moments, when a reversal in saturating magnetization is to occur. More particularly, this object of the invention relates to converters with series connected make and break contacts and aims at securing a continuance and reliable completion of the reversal in reactor saturation subsequent to the circuit opening moment.

According to one of the novel features of my invention, the stators of the two drive motors for the cam-controlled make and break contacts are both stationary rather than being rotatably journalled, and the angular position of the two drive shafts is controlled by electric phase shift means which determine these positions relative to the voltage cycle of the converter-energizing supply line. More specifically, each of the two motors may be energized from the current supply line of the converter through a separate phase shifter consisting, for instance, of a rotationally adjustable phase-shift transformer. According to another feature of my invention, the time-overlapped make and break contacts are series-connected with each other, and a valve, preferably a two-electrode valve of the dry-rectifier or barrier-layer type, is connected across the gap of only the break contact so that this valve can conduct only after the break contact opens to be then traversed by any residual current (step current) that may continue flowing until the shortly following current zero passage.

The foregoing objects and features of my invention will be apparent from the embodiments described in the following and illustrated by way of example on the drawing, showing the schematic circuit diagram of a three-phase converter.

The converter is energized from a three-phase current supply line through a power transformer 1, whose respective secondaries 2 energize the three converter phase circuits. Reference numerals are applied to only one of these circuits because the two others have the same design and operate in the same manner except that the operation occurs in the proper phase sequence. Series-connected with the transformer winding 2 in each converter phase circuit is the main winding of a commutating reactor 3 whose saturable core becomes temporarily desaturated near the current zero passages to then distort the current wave into a step of extremely small current magnitude (step current) so that the converter contact means of the pertaining phase circuit may open within the current-step interval without sparking. Also series-connected in each phase circuit are two contact devices 4 and 5 which operate periodically in synchronism with the voltage cycle of the alternating current so that the phase circuit is closed and can conduct current only during a given (positive) half wave of the current wave. The two contact devices, hereinafter briefly called "contacts," are series-connected with each other. The load circuit of the converter, energized by rectified current, is shown to include a load 6 in series with a smoothing reactor 7.

The contacts 4 and 5 are normally biased by respective springs 8 and 9 toward the circuit-closing position. Each contact is engageable by a tappet 10 or 11 whose movement is controlled by an eccentric cam 12 or 13. The sequence of contact operation is such that the contact 5 closes first. Contact 4 closes at a somewhat later moment of the cycle, and thus completes the converter phase circuit. At the end of the conducting period, the contact 5 opens ahead of contact 4 and thus opens the phase circuit. It will, therefore, be understood that the contacts 4 of the respective phase circuits operate only as make contacts, and that the contacts 5 operate only as break contacts.

The cams 12 for controlling the make contacts are mounted on a common shaft 14. Similarly, the cams 13 for controlling the break contacts 5 are all mounted on a common shaft 15. Each shaft is driven by a synchronous motor 16 or 17. The motors are energized from the current supply line of the converter through respective adjustable phase shifters 18 and 19 consisting, for instance, of rotationally-adjustable phase-shift transformers.

A two-electrode valve 20 is connected across the gap of the break contact 5 in each phase circuit, while no such valve is provided across the make contact. The valve may consist of a dry rectifier (barrier-layer rectifier).

By changing the adjustment of the phase-shift transformer 18, the phase position of the make control cams 12 relative to the rotating field of the current supply line and hence relative to the voltage cycle in the respective converter phase circuits can be adjusted or regulated. A similar adjustment or regulation of the break control cams 13 is afforded by the phase-shift transformer 19. The phase-shift transformer 19 may thus serve for controlling the rectified output voltage of the converter in accordance with the delayed-commutation method. That is, by correspondingly adjusting or regulating the phase-shift transformer 18, the closing moment of the make contact 4 and consequently the closing moment of the respective phase circuits can be shifted to occur with a larger or smaller delay relative to the moment at which the phase voltage of the circuit to be closed is just equal to the phase voltage of the circuit to be opened. The above-described adjustment of the phase-shift transformer 19 for the break contacts has the effect of varying the overlapping period of the make and break contacts within each phase circuit, for instance in order to correspondingly vary the interphase commutation intervals. The control and regulation of either phase-shift transformer may be effected manually or automatically, as is more fully described in the above-mentioned copending application.

Instead of the above-mentioned rotary phase-shift transformers, other electric phase-shift means may be used for changing the phase angle of the rotating motor field relative to the rotating field of the alternating current supply line.

The functioning of the above-mentioned valves 20 in the converter will be understood from the following. The valve 20 in each converter phase circuit has the same flow direction as the make and break contacts. When the make and break contacts in the same phase circuit are open, the valve 20 is disconnected from the phase voltage. As mentioned, the break contact 5 closes ahead of the make contact 4. At that moment, the valve 20 becomes shorted so that no voltage is impressed across it when thereafter the make contact 4 completes the phase circuit. At the end of the conducting half-wave period, the break contact 5 opens first. This occurs within the step interval produced by the commutating reactor 3. Consequently, only a light residual voltage becomes effective across valve 20, and any slight step current then flowing through the valve will terminate very shortly thereafter when the current reaches its zero value. Consequently, the valve 20 is never subjected to the converter load current proper but carries an extremely small current only during an extremely short interval of time. It will also be obvious that the valve 20 has no effect upon the closing performance of the contacts since these are separately controlled by the respective drive motors. However, the valve has an appreciable effect with respect to the magnetizing conditions of the commutating reactor. The reversal in saturating magnetization of the reactor occurs during the above-mentioned step intervals, and the step current flowing during these intervals is one of the components that determine the magnetizing conditions of the reactor. Consequently, the valve 20, by its capability of extending the interval during which the step current may flow, secures a correspondingly continued reverse magnetization of the commutating reactor.

Since the valve is parallel-connected only to the break contact, but not to the make contact, the valve is called upon to block a reverse voltage only during extremely short intervals of time, and it is also made certain that the inception of the current flow through each phase circuit is always definitely determined by the operation of the make contact even with a mechanical delay-angle control, i. e. a control of the delivered voltage by phase-displacing the closing moment of the make contact. The fact that the reverse voltage is effective at the valve only during very short intervals, has the advantage that a very small valve is safely sufficient. For instance, if the valve consists of a barrier-layer rectifier, the number of individual disc elements to be series-connected may be much smaller than when the reverse voltage could act during a longer period of time. The reduced number of discs has also the effect of keeping the threshold voltage of the rectifier correspondingly low. This has a favorable effect during the opening performance of the break contact because it minimizes the voltage recurring during opening of the break contact.

It will be obvious to those skilled in the art, upon a study of this disclosure, that converters according to the invention permit of various modifications and may involve converter circuits and motor-actuated contact drives other than specifically illustrated and described, without departing from the essential features of my invention and within the scope of the claims annexed hereto.

I claim:

1. An electric contact converter, comprising alternating-current supply means, a converter phase circuit connected to said supply means and having a saturable series reactor, two periodic contact devices series connected in said circuit and having respective closing periods partially overlapping each other so that one of said contact devices operates only to close said circuit, said two devices having respective drive means synchronous with the voltage cycle of said supply means, one of said drive means having adjustable phase shift means while the other drive means is independent of said phase shift means so that said one drive means is phase adjustable relative to the other for varying the closing period of one of said devices relative to the other, and a valve circuit connected across only the other contact device.

2. An electric contact converter, comprising alternating-current supply means, a converter phase circuit connected to said supply means and having a saturable series reactor, two periodic contact devices series connected in said circuit and having respective closing periods partially overlapping each other so that one of said contact devices operates only to close said circuit, a barrier-layer rectifier connected across only the other of said contact devices and poled for conducting in the same current direction as said two devices, said two devices having respective drive means synchronous with the voltage cycle of said supply means, and adjustable phase shift means joined with one of said drive means independently of the other drive means for varying the closing period of one of said devices relative to the closing period of the other device.

References Cited in the file of this patent
UNITED STATES PATENTS

| | | |
|---|---|---|
| 2,193,421 | Janetschke | Mar. 12, 1940 |
| 2,227,937 | Koppelmann | Jan. 7, 1941 |
| 2,298,130 | Janetschke | Oct. 6, 1942 |
| 2,361,155 | Stevens et al. | Oct. 24, 1944 |
| 2,276,784 | Koppelmann | Mar. 17, 1954 |